July 5, 1932.  C. C. CHEYNEY  1,865,677
SOUND DEADENER
Filed July 19, 1929  2 Sheets-Sheet 1

INVENTOR
Charles C. Cheyney
By
J. Wm. Ellis
ATTORNEY

July 5, 1932.  C. C. CHEYNEY  1,865,677
SOUND DEADENER
Filed July 19, 1929   2 Sheets-Sheet 2

INVENTOR
Charles C. Cheyney
By J. Wm Ellis
ATTORNEY

Patented July 5, 1932

1,865,677

UNITED STATES PATENT OFFICE

CHARLES C. CHEYNEY, OF BUFFALO, NEW YORK, ASSIGNOR TO BUFFALO FORGE COMPANY, OF BUFFALO, NEW YORK, A CORPORATION OF NEW YORK

SOUND DEADENER

Application filed July 19, 1929. Serial No. 379,535.

My invention relates in general to sound deadeners and in particular to a tube section which may be interested in a tube or duct carrying air in a mechanical ventilating system.

The principal object of my invention has been to provide such a device which would effectively prevent the transmission of sound from the source of the air to the place where it is used.

Another object has been to provide a device which may be inexpensive to manufacture, and one easily and conveniently installed.

It is well known to those skilled in the art that in mechanical ventilating systems, noise is produced in the ventilating fans or in the motors driving them, or is due to the velocity of the air itself passing through the duct system. This noise, of course, is objectionable when transmitted to, for instance, an auditorium where the air is used. It is, therefore, highly desirable that some means be employed to deaden such noise and prevent its transmission.

The above objects and advantages have been accomplished by the device shown in the accompanying drawings, of which:

Figs. 4, 5 and 6 show various modifications of the baffle elements.

My device comprises an open frame 10 having top and bottom walls 11 and 12, respectively, and side walls 13. This frame is made of any suitable material such, for instance, as asbestos, fiber, plaster, rock wool, or cork board, or any other suitable material which will have a deadening effect upon sound vibrations. The frame made by means of the boards preferably has inside dimensions substantially the same as the inside dimensions of the duct with which it is to be sed and an angle iron 14 is preferably secured to the edges of the frame with its upstanding flanges at the forward surfaces. By means of these flanges the section may be secured by bolts (not shown) or other suitable means to the ends of the air ducts of the system.

Figure 1:
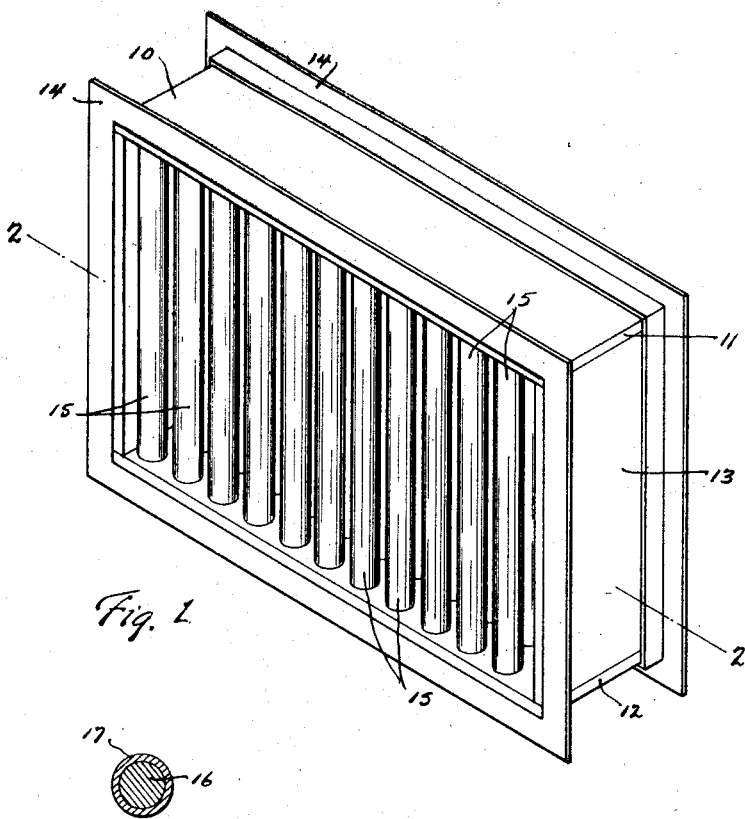
Fig. 1 is a perspective view of my complete device.
Figure 2:
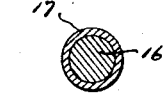
Fig. 2 is a sectional plan view taken on line 2—2 of Fig. 1.
Figure 3:
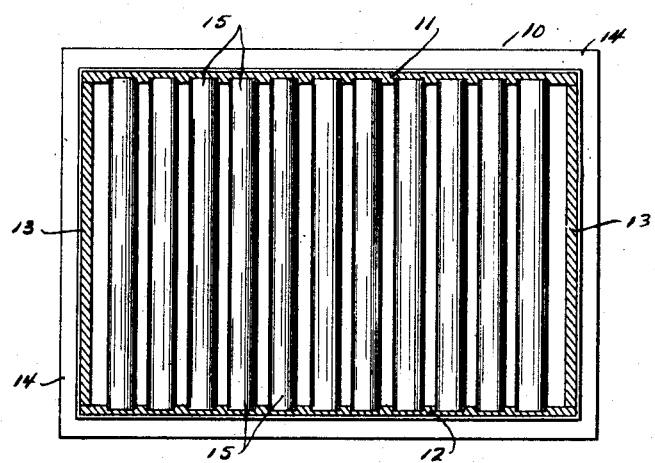
Fig. 3 is a sectional elevation of the device taken on line 3—3 of Fig. 2.

Extending across the open frame are a plurality of baffle members 15. These baffle members extend preferably from the bottom 12 to the top 11, and are preferably let into recesses formed in the faces of the bottom and top as shown in Fig. 3. There are a number of parallel rows of these members extending across from one side wall 13 to the opposite side wall, and the members in adjacent rows are preferably staggered in relation to each other so that air passing through in the direction of the arrows indicated in Fig. 2 will not have a straight line through which to pass, but will strike the sides of the members and be deflected, thereby passing through the frame in a somewhat zig-zag manner. In such passage the sound vibrations carried by the air are absorbed or deadened.

The boards forming the top 11, bottom 12, and side walls 13 of the frame are fastened together by any suitable means, but may, if desired, be secured together by a piece of canvas (not shown) or other fabric wrapped about the frame and secured under the angle 14.

Figure 5:
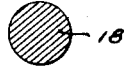
Figure 6:
Figure 2:
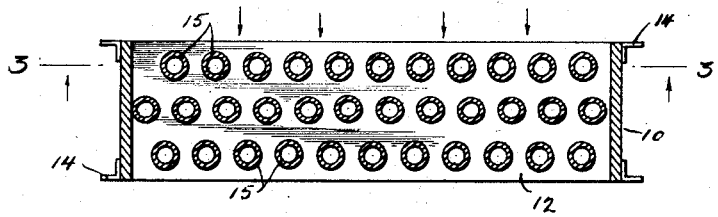

The baffle members 15 may be made of any suitable material such as asbestos, felt, rubber or other suitable soft, non-metallic material which will absorb or deaden sound vibrations. These members may be in the form of tubes, as shown in Fig. 2, or they may be in the form of rods 16, of any suitable rigid material around which is a jacket 17 of sound deadening material (see Fig. 4). Furthermore, these members may be in the form of a solid rod 18, shown in Fig. 5, which rod, of course, is made entirely of sound deadening material. The members may be round in cross-section or may be stream line in cross-section, as shown in Fig. 6.

When my device is to be used, it is obvious that it is inserted in the air duct with which it is to be used and that after the air strikes the baffle members, the vibration will be absorbed by them and will, therefore, not be transmitted through the duct to the place where the air is to be used.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. The combination with a ventilating system, having a duct, of a sound deadener comprising a frame forming a section of the duct, and a plurality of cylindrical baffle members carried by the frame and having their axes positioned at right angles to the direction of air flow in the duct, the frame and baffle members being made of sound deadening material.

2. The combination with a ventilating system, having a duct, of a sound deadener comprising a frame forming a section of the duct, and a plurality of cylindrical baffle members carried by the frame and arranged in adjacent rows and staggered relation, the baffle members having their axes positioned at right angles to the direction of air flow in the duct, the frame and baffle members being made of sound deadening material.

3. The combination with a ventilating system, having a duct, of a sound deadener comprising a frame forming a section of the duct, and a plurality of tubular baffle members carried by the frame and having their axes positioned at right angles to the direction of air flow in the duct, the frame and baffle members being made of sound deadening material.

4. The combination with a ventilating system, having a duct, of a sound deadener comprising a frame forming a section of the duct and open for substantially the full area of the duct at both ends for the passage of air, and a plurality of rows of baffle members, arranged in staggered relation, each member being of symmetrical cross-section and extending across the duct, the frame and baffle members being made of sound deadening material.

In testimony whereof, I have hereunto signed my name.

CHARLES C. CHEYNEY.